May 21, 1929. M. H. TONCRAY 1,714,252
AUTOMOBILE BODY
Filed Jan. 27, 1927
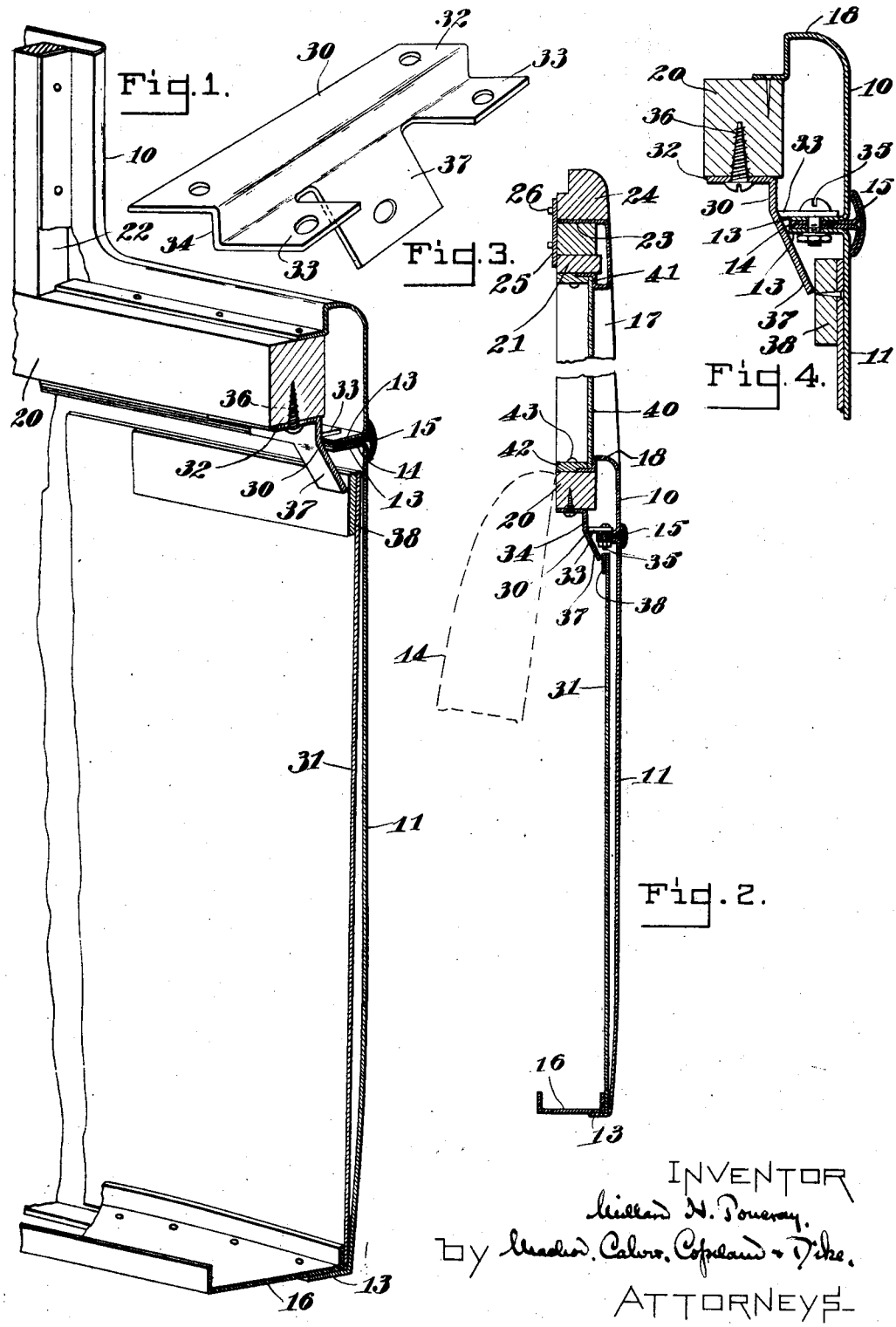

Patented May 21, 1929.

1,714,252

UNITED STATES PATENT OFFICE.

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN.

AUTOMOBILE BODY.

Application filed January 27, 1927. Serial No. 164,079.

This invention relates especially, although not exclusively, to closed metal automobile bodies of the frameless type and has for its objects to facilitate the interior trimming of such a body and the mounting of the fixed rear window, as well as to provide improved means for bracing, strengthening, and stiffening the body shell particularly around the rear window and adjacent the seat back. The invention also contemplates provisions for protecting the lower back from damage by tools or the like commonly stored in the vicinity thereof.

The more particular objects of the invention, together with means whereby the latter may be carried into effect, will best be understood from the following description of one form of embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

In said drawings:

Fig. 1 is a fragmentary interior perspective view of a portion of the rear of a closed automobile body, showing the same before trimming;

Fig. 2 is a sectional elevational view through the central portion of the rear of an automobile body;

Fig. 3 is a detail perspective view of one form of support for the trim and window frame;

Fig. 4 is a detail sectional elevational view showing the trim frame together with certain adjacent parts.

The invention is herein illustrated in connection with an automobile body of the type known as a coach and constructed in accordance with principles more fully explained in another application filed November 20, 1925, Serial No. 70,298, although it will be understood that, while certain features of the invention are particularly applicable to such a body, the precise type and construction of the latter may be widely varied. In the drawings is shown the interior of the rear portion of such a body, which is of the frameless type in which the shape is determined and the strains and stresses taken primarily by an exterior metal shell composed of connected preformed panels as distinguished from the body which comprises a covering of panels applied to a skeleton frame which determines the shape of the body and takes the stresses and strains.

In the construction shown the panel assembly constituting the metal shell includes upper and lower back panels 10 and 11 which are formed with inturned edge flanges 13, the flanges of adjacent panels being riveted or otherwise appropriately secured together with the interposed flange 14 of the combined finishing and stiffening molding 15 to form a panel joint of the character more fully described in an application filed August 15, 1925, by O. J. Groehn, Serial No. 50,406. The lower flange 13 of the lower panel 11 is riveted or otherwise appropriately secured to the lower cross sill member 16, and the upper panel 10 is formed with a rear window opening 17 surrounded by an inturned flange 18.

In accordance with one feature of the invention, an improved trim frame and rear window support is secured within the interior of the metal body shell and secured to the joint between the upper and lower panels One suitable construction for this purpose may comprise a relatively large lower cross member 20 positioned just below the rear window opening 17 and an upper cross member 21 positioned just above the rear window opening and joined by upright members 22 which extend to the top flange 23 of the body shell. A header rail 24 rests upon the flange 23 and is connected with the trim frame by a strap or bracket 25 secured thereto by screws 26 passing through the strap 25 and engaging the header rail 24 and the upright members 22. The lower cross member 20 of the trim frame is supported upon the joint between the upper and lower panels by a bracket 30. Preferably, the bracket is constructed and arranged to engage the stiffened upper edge of a panel protector 31 and thereby hold it against the panel. A bracket for this purpose may be constructed of any suitable material, such as steel, having a flat portion 32 adapted to engage the bottom of the lower cross member 20 and a substantially parallel flat portion 33 spaced therefrom and connected therewith by a web 34. The flat portion 33 is secured to the joint between the upper and lower panels in any appropriate manner as by bolts 35, and if desired the flat portion 32 may be secured to the lower cross member 20 by screws 36. In accordance with the preferred construction, the web 34 is provided with an extension 37 which is constructed and arranged to engage a slat of wood 38 or other stiffening material secured along the upper edge of the lower panel protector 31 to hold the latter in place.

If desired, the trim frame comprising the cross members 20 and 21 and the upright members 22 may be assembled at the bench and inserted as thus assembled within the body shell and suspended from the header rail 24 by the straps 25, the inturned flange 18 of the window opening being then tacked or secured to the trim frame. The bracket 30 is then moved into position against the bottom of the lower cross members 20 and secured to the joint between the upper and lower panels by the bolts 35. If desired, the upper flat portion 32 of the bracket may be fixed to the cross member 20 by screws 36. A rear window 40 is then placed against the shoulder 41 of the flange 18 and is held in place by trimming strips 42 which are secured to the trim frame in any suitable manner as by screws 43. The bottom edge of the lower panel protector 31 is then slipped into the slot between the lip of the rear cross sill member 16 and the lower back panel 11 and the protector buckled to allow the stiffened upper edge thereof to slip into place behind the depending extension 37 of the bracket 30. The finish trimming is then inserted and secured in place in accordance with the principles described in another application filed May 2, 1927, Serial No. 185,125.

The invention not only provides a trim frame of simple construction which may be readily secured within the body shell but also provides means whereby the back construction is strengthened and given greater rigidity. Furthermore, the lower back panel is protected from damages by contact with tools which in many instances are carried in an automobile beneath or behind the rear seat. The construction also furnishes a rigid support for the back 44 of the rear seat which is arranged to engage the relatively large lower cross member of the trim frame.

What I claim is:

1. In an automobile body, the combination of an exterior shell having an upper and a lower panel joined together, a trim frame within the shell, a lower panel protector, and means constructed and arranged to tie said frame to the joint between the upper and lower panels and hold the lower panel protector in place.

2. In an automobile body, the combination of an exterior shell having an upper and a lower panel joined together, a trim frame within the shell, a lower panel protector, a bracket secured to the joint between the upper and lower panels to support said frame and having a depending portion arranged to engage the panel protector.

3. In an automobile body, the combination of an exterior shell having an upper and a lower panel joined together, a trim frame within the shell surrounding a back window, and a bracket having spaced substantially parallel portions secured to said frame and to the joint between the upper and lower panels and connected by a web.

4. In an automobile body, the combination of an exterior shell having an upper and a lower panel joined together, a trim frame within the shell, a lower panel protector, and a bracket having spaced substantially parallel portions secured to said frame and to the joint between the upper and lower panels, said spaced portions being connected by a web having an extension arranged to engage the panel protector.

5. In an automobile body, the combination of an exterior shell having an upper and a lower panel joined together, a lower cross sill member to which the lower panel is secured, a trim frame within the shell, a lower panel protector having its lower edge between the lip of the cross sill member and lower panel, and means constructed and arranged to tie said frame to the shell and hold the upper edge of the lower panel protector in place.

6. In an automobile body, the combination of an exterior shell having an upper and a lower panel joined together, a trim frame within the shell, a lower panel protector having its upper edge stiffened, and a bracket secured to the joint between the upper and lower panels to support said frame and having a depending portion arranged to engage a portion of the stiffened upper edge of the panel protector to hold the protector against the panel.

7. In an automobile body, the combination of an exterior shell having a back window opening, a trim frame surrounding said window opening and secured to said shell, a protector having its upper edge stiffened, and a bracket secured to the trim frame and having a portion arranged to engage a portion of the stiffened upper edge of the protector to hold the same against the shell.

8. In an automobile body, the combination of an exterior shell having a back window opening, a lower cross sill member to which the shell is secured, a trim frame within the shell surrounding the window opening, a protector having its lower edge between the lip of the cross sill member and the shell, and a bracket secured to the trim frame and having a portion arranged to engage an upper portion of the protector to hold the same against the shell.

In testimony whereof I affix my signature.

MILLARD H. TONCRAY.